B. T. GENTHNER.
SMOKING PIPE.
APPLICATION FILED JULY 6, 1910.
974,051.
Patented Oct. 25, 1910.
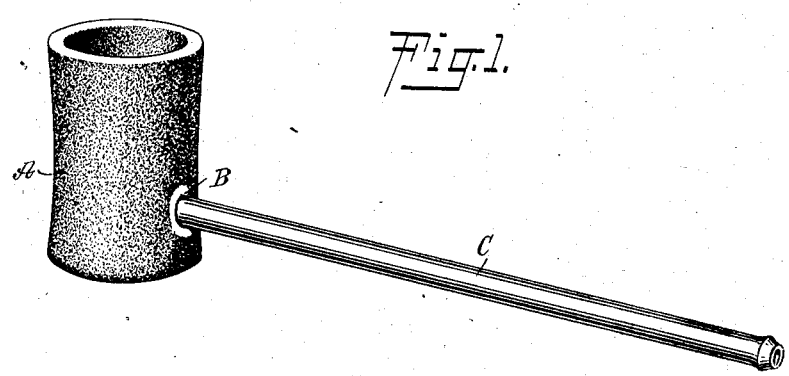
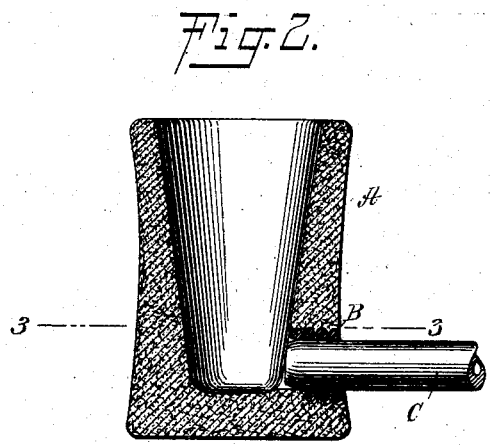
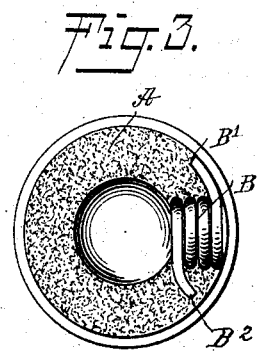
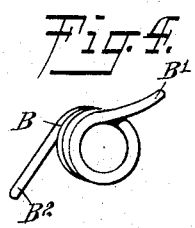
WITNESSES:
INVENTOR
Benjamin T. Genthner
BY
ATTORNEYS

UNITED STATES PATENT OFFICE.

BENJAMIN THOMAS GENTHNER, OF FOXCROFT, MAINE.

SMOKING-PIPE.

974,051. Specification of Letters Patent. Patented Oct. 25, 1910.

Application filed July 6, 1910. Serial No. 570,527.

*To all whom it may concern:*

Be it known that I, BENJAMIN T. GENTHNER, a citizen of the United States, and a resident of Foxcroft, in the county of Piscataquis and State of Maine, have invented a new and Improved Smoking-Pipe, of which the following is a full, clear, and exact description.

The object of the invention is to provide a new and improved smoking pipe having a bowl of a plastic material and provided with a reinforcement to render the bowl exceedingly strong and durable the reinforcement also forming a socket for the reception of the pipe stem, to permit of conveniently and securely fastening the same in position on the bowl.

For the purpose mentioned use is made of a socket formed of a wire coil terminating at its ends in extension arms, the said socket and its extension arms being embedded in the plastic material of the bowl, the coil forming a socket for the reception of the pipe stem.

A practical embodiment of the invention is represented in the accompanying drawings forming a part of this specification, in which similar characters of reference indicate corresponding parts in all the views.

Figure 1 is a perspective view of the smoking pipe; Fig. 2 is an enlarged sectional side elevation of the bowl; Fig. 3 is a sectional plan view of the same on the line 3—3 of Fig. 2; and Fig. 4 is a perspective view of the reinforcing socket.

The bowl A of the smoking pipe is made of plastic material, such as asbestos and Portland cement, and in the side wall of the bowl A is embedded a socket B for engagement by the pipe stem C, as indicated in Fig. 1. The socket B is made of a wire coil having its ends terminating in arms B', B² extending in opposite directions from the coil and curved to conform to the circular shape of the bowl, as shown in the sectional plan view (see Fig. 3). The convolutions of the wire coil forming the socket B are embedded in the plastic material, and the arms B', B² are likewise embedded in the plastic material, and the opening of the wire coil extends from the outer surface of the bowl A to the inside thereof adjacent to the bottom of the bowl, as will be readily understood by reference to Fig. 2.

By the arrangement described the socket B and its arms B', B² reinforce the plastic material of the bowl A at the very point at which the greatest strain is exerted, that is, at the junction of the bowl with the pipe stem C, by the use of the socket B. It will also be noticed that the pipe stem C can be readily screwed into the convolutions of the socket B at the opening thereof, so as to securely hold the pipe stem C in position in the socket.

The pipe stem C is usually made of a comparatively soft material, and hence it readily screws into the opening of the socket B, the convolutions forming the necessary thread on the end of the pipe stem C.

Having thus described my invention, I claim as new and desire to secure by Letters Patent:

1. A smoking pipe, comprising a bowl of plastic material, a socket formed of a wire coil having its convolutions embedded in the said plastic material, and a pipe stem engaging the opening in the said socket.

2. A smoking pipe, comprising a bowl of a plastic material, a socket formed of a wire coil having its convolutions embedded in the said plastic material, the opening in the coil extending from the outer face of the bowl to the inside thereof, and a pipe stem engaging the said socket opening.

3. A smoking pipe, comprising a bowl of a plastic material, a socket formed of a wire coil having its convolutions embedded in the said plastic material, the opening in the coil extending from the outer face of the bowl to the inside thereof, the ends of the coil terminating in arms completely embedded in the plastic material, and a pipe stem engaging the said socket opening.

4. A smoking pipe, comprising a bowl of a plastic material, a socket formed of a wire coil having its convolutions embedded in the said plastic material, the opening in the coil extending from the outer face of the bowl to the inside thereof, the ends of the coil terminating in arms extending in opposite directions from the coil and completely embedded in the plastic material, and a pipe stem engaging the said socket opening.

In testimony whereof I have signed my name to this specification in the presence of two subscribing witnesses.

BENJAMIN THOMAS GENTHNER.

Witnesses:
CHARLES W. HAYES,
CHAS. E. WASHBURN.